A. W. McCREARY.
FERTILIZER DISTRIBUTER.
APPLICATION FILED NOV. 28, 1916. RENEWED OCT. 16, 1918.

1,308,714.

Patented July 1, 1919.
2 SHEETS—SHEET 1.

Inventor
A. W. McCreary
By Victor J. Evans
Attorney

Witnesses
E. Q. Ruppert
Wm. R. Smith

A. W. McCREARY.
FERTILIZER DISTRIBUTER.
APPLICATION FILED NOV. 28, 1916. RENEWED OCT. 16, 1918.
1,308,714.
Patented July 1, 1919.
2 SHEETS—SHEET 2.
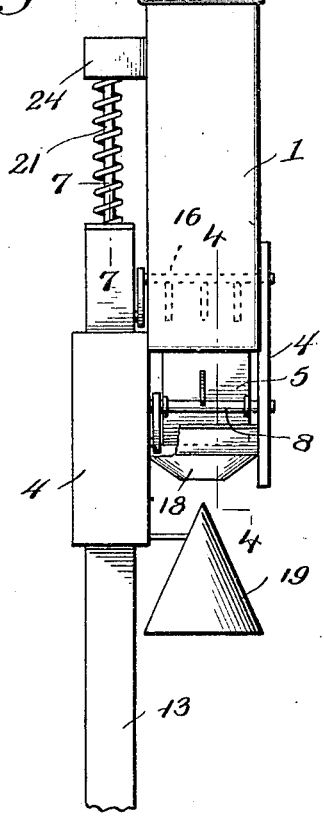
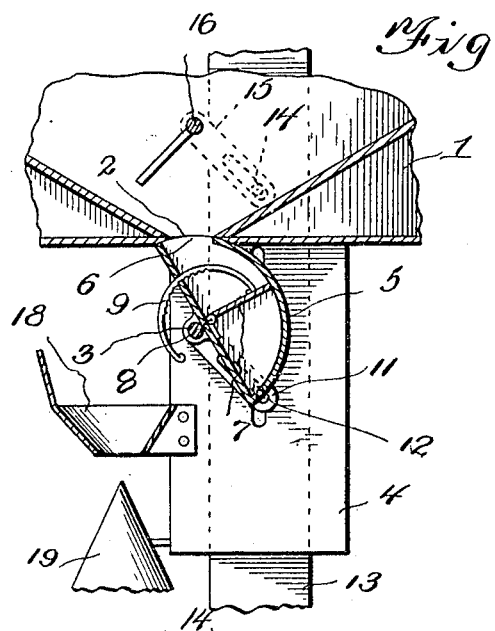
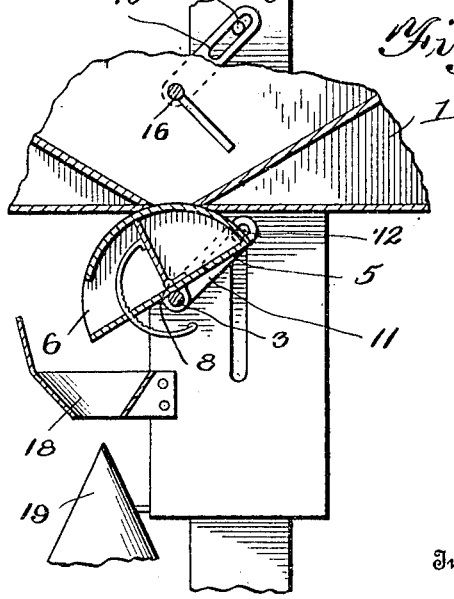
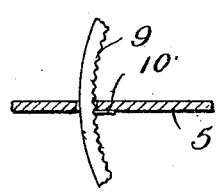
Inventor
A. W. McCreary
By Victor J. Evans
Attorney
Witnesses
E. R. Ruppert
Wm. R. Smith

UNITED STATES PATENT OFFICE.

ALFRED W. McCREARY, OF MOUNT PLEASANT, PENNSYLVANIA.

FERTILIZER-DISTRIBUTER.

1,308,714.  Specification of Letters Patent.  Patented July 1, 1919.

Application filed November 28, 1916, Serial No. 133,911. Renewed October 16, 1918. Serial No. 258,393.

*To all whom it may concern:*

Be it known that I, ALFRED W. MCCREARY, a citizen of the United States, residing at Mount Pleasant, State of Pennsylvania, have invented new and useful Improvements in Fertilizer-Distributers, of which the following is a specification.

This invention relates to a fertilizer distributer and has for its primary object to construct an apparatus of this character, the parts of which may be automatically operated when the apparatus is placed upon the ground adjacent the plant.

An object of the invention is to provide an apparatus having means whereby fertilizing material may be distributed around the roots of a plant or insect powder deposited upon the plant.

Another object of the invention is the novel manner of constructing the receptacle so that the amount of material passing to each plant may be accurately regulated.

Besides the above my invention is distinguished in so shaping a receptacle and associating the same with the outlet of the container that the receptacle will answer the purpose of a valve.

With these and other objects in view the invention will be better understood from the following detail description taken in connection with the accompanying drawings wherein:—

Fig. 3 is a front elevation thereof.

Figs. 4 and 5 are vertical sectional views thereof.

Fig. 6 is a detail view of the locking means having the false bottom.

Figure 1:
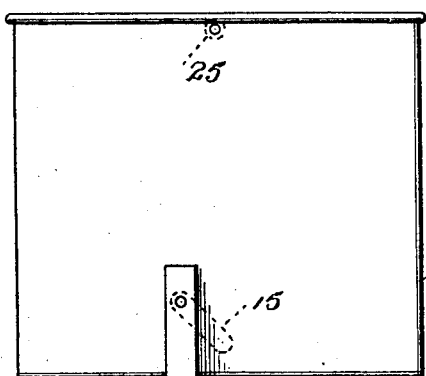
Figures 1 and 2 are side elevations of the invention.
Figure 2:
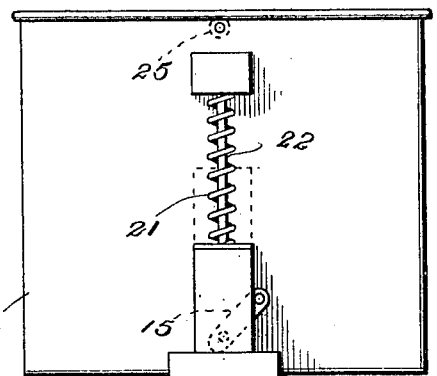

Referring to the drawings the numeral 1, designates a container in which the fertilizer material is arranged. This container is provided at its bottom with an outlet 2. Coöperating with the outlet 2 and supported on a shaft 3, journaled in brackets 4, carried by the container 1, is a receptacle 5. This receptacle 5 is provided with an inlet 6 normally in registration with the outlet 2 so that material may pass from the container into the receptacle.

The amount of material passing into the receptacle is regulated by the false bottom 7, mounted within the receptacle for swinging movements as indicated at 8 and having connection with an arcuate latching member 9, the teeth of which coöperate with the tongue 10 carried by the receptacle. The shaft 8 has connection with a link 11 that in turn has a pin and slot connection 12 with a member 13 slidably mounted in one of the brackets 4. This member also has pin and slot connection 14 with a second link 15 that in turn connects to an agitator 16 mounted in the container directly above the outlet 2. From this arrangement it will be seen that when the lower end 17 of the member is brought into engagement with the ground the member will be given an upward movement which through its connection with the links will give a partial rotation to the container and agitator. This partial rotation of the receptacle moves the inlet out of registration with the outlet and moves a portion of the wall of the container over the outlet for the prevention of the passage of material from the container.

When in this position the contents of the receptacle is deposited into a chute 18 from whence it passes onto a distributer member 19, supported in any suitable manner.

Figure 8:
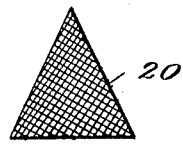
Fig. 8 is a detail view of one form of distributer member on line 7—7 of Fig. 3.
Figure 7:
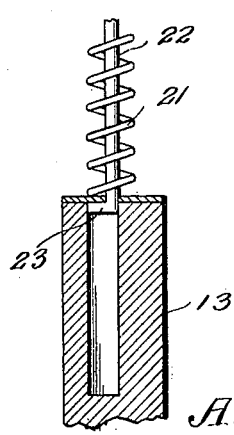
Fig. 7 is a sectional view through the member 13.

In Figs. 1, 2, 3, 4 and 5 the member 19 is shown with a solid surface, whereas in Fig. 8 the member is formed from a foraminous material 20 such as wire screen. For returning the parts to normal position after the end 17 has been moved out of engagement with the ground I provide a coil spring 21 encircling a rod 22 that has a slidable connection 23 with the member 13. The ends of the spring engage respectively the upper end of the member 13 and a bearing 24 mounted upon the container. The apparatus is moved from plant to plant by the handle 25. A very important feature of my invention is the use of the member 13 which besides giving movements to the other parts of the apparatus acts as a guide and determines when the member 19 is directly over a plant.

It is to be understood that the structural embodiment of the invention as a whole and its various features as shown is merely illustrative and not restrictive as I am well aware that many of the details of construction can be widely varied without departing from the spirit of the invention; such as the means of mounting the member 19 and associating the brackets and member 13 with the container. I therefore do not desire to be limited in these particulars or in any others except as set forth in the appended claims.

What I claim is:—

1. A fertilizer distributer comprising a container having an outlet, a receptacle one wall of which being shaped to close said outlet and further being provided with an inlet adapted to register with said outlet when the receptacle is in one position and means for giving movements to the receptacle, said means including a member slidably mounted on the container and having a portion arranged to engage the ground.

2. A fertilizer distributer comprising a container having an outlet, an agitator arranged in the container directly above the outlet, a receptacle rotatably mounted below the container and having an inlet adapted to be brought into registration with said outlet and ground engaging means slidably mounted on the container and having a connection with the agitator and the receptacle whereby the receptacle may be given movements for moving the inlet out of registration with the outlet and the agitator operated.

3. A fertilizer distributer comprising a container having an outlet, an agitator mounted for movements directly above the outlet, a receptacle normally in communication with the outlet, a shaft supporting the receptacle, a member slidably mounted upon the container and links connecting the shaft and agitator to said member, said member having a portion arranged to engage the ground for moving the member in one direction and a spring arranged to oppose this movement.

4. A fertilizer distributer comprising a container having an outlet, a receptacle mounted directly under the outlet and having an adjustable false bottom, an agitator mounted within the container directly above the outlet, a ground engaging member mounted for vertical movements upon the container, a spring arranged to oppose the movement of the member and links connecting the member directly to the agitator and receptacle.

In testimony whereof I affix my signature.

ALFRED W. McCREARY.

Copies of this patent may be obtained for five cents each, by addressing the "Commissioner of Patents, Washington, D. C."